US012694897B1

(12) United States Patent
Chen et al.

(10) Patent No.: US 12,694,897 B1
(45) Date of Patent: Jul. 28, 2026

(54) NEAR FIELD TRANSDUCERS HAVING MAGNETIC INLAYS FOR IMPROVED HEAT-ASSISTED MAGNETIC RECORDING

(71) Applicant: Seagate Technology LLC, Fremont, CA (US)

(72) Inventors: Weibin Chen, Bloomington, MN (US); Jianhua Xue, Eden Prairie, MN (US); Michael Allen Seigler, Eden Prairie, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 19/215,617

(22) Filed: May 22, 2025

(51) Int. Cl.
| | |
|---|---|
| *G11B 5/48* | (2006.01) |
| *G11B 5/40* | (2006.01) |
| *G11B 5/73* | (2006.01) |

(52) U.S. Cl.
CPC .............. *G11B 5/4866* (2013.01); *G11B 5/40* (2013.01); *G11B 5/7375* (2019.05); *G11B 2220/2516* (2013.01)

(58) Field of Classification Search
None
See application file for complete search history.

(56) References Cited

U.S. PATENT DOCUMENTS

| | | | |
|---|---|---|---|
| 9,799,352 | B1 | 10/2017 | Chen et al. |
| 10,163,456 | B2 | 12/2018 | Chen et al. |

| | | | | |
|---|---|---|---|---|
| 10,410,664 | B1 | 9/2019 | Cheng et al. | |
| 10,490,215 | B1 * | 11/2019 | Chen ..................... | G11B 5/4866 |
| 11,798,581 | B1 * | 10/2023 | Inturi ..................... | G11B 13/08 |
| 11,798,582 | B2 | 10/2023 | Puri et al. | |
| 2014/0307534 | A1 * | 10/2014 | Zhou ....................... | G11B 5/314 |
| | | | | 216/22 |
| 2016/0133286 | A1 * | 5/2016 | Lee ....................... | G11B 5/4866 |
| | | | | 369/13.33 |
| 2016/0133291 | A1 * | 5/2016 | Chen ...................... | G11B 5/314 |
| | | | | 369/13.33 |
| 2016/0275972 | A1 * | 9/2016 | Zhao ..................... | G11B 5/3133 |
| 2016/0351209 | A1 * | 12/2016 | Chen ...................... | G11B 5/3116 |
| 2016/0351214 | A1 * | 12/2016 | Kautzky ................ | G11B 5/314 |
| 2016/0351221 | A1 * | 12/2016 | Blaber ................. | G11B 5/6088 |
| 2016/0351222 | A1 | 12/2016 | Blaber et al. | |
| 2022/0319543 | A1 * | 10/2022 | Puri ....................... | G11B 13/08 |
| 2022/0415354 | A1 * | 12/2022 | Cheng ................... | G11B 5/314 |

* cited by examiner

*Primary Examiner* — Peter Vincent Agustin

(74) *Attorney, Agent, or Firm* — Mueting Raasch Group

(57) ABSTRACT

Described are heat-assisted magnetic recording heads that include near-field transducers having a magnetic inlay incorporated into the emitter disk, for example to improve write field properties such as the write field angle (decrease) and/or write field strength (increase), and which can contribute to increased areal density capability. Aspects involve applying an inlay of a magnetic material to the emitter disk of a near-field transducer. The inlay may optionally extend into the sunken disk of the near-field transducer. The inlay thickness, length, shape, and recess from the media-facing surface may be selected or adjusted to achieve desired magnetic, optical, and/or thermal characteristics.

20 Claims, 8 Drawing Sheets

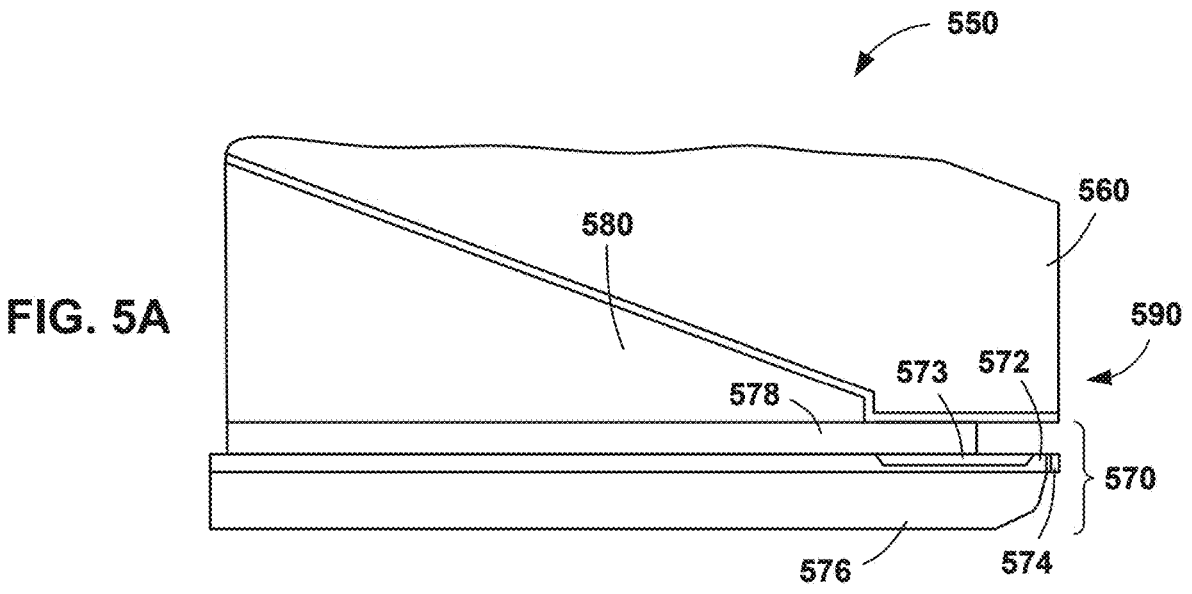
FIG. 5A
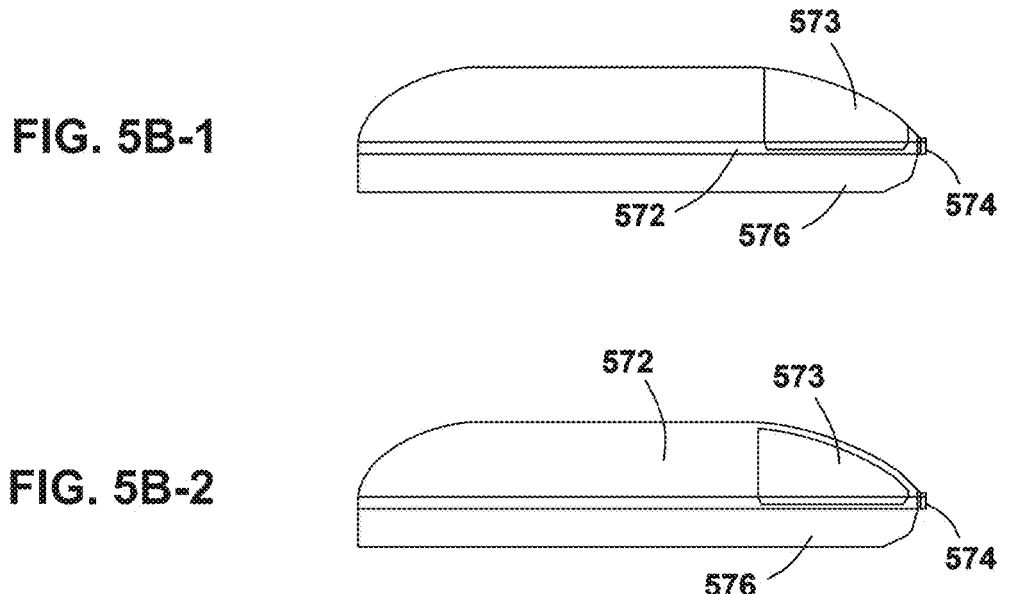
FIG. 5B-1
FIG. 5B-2

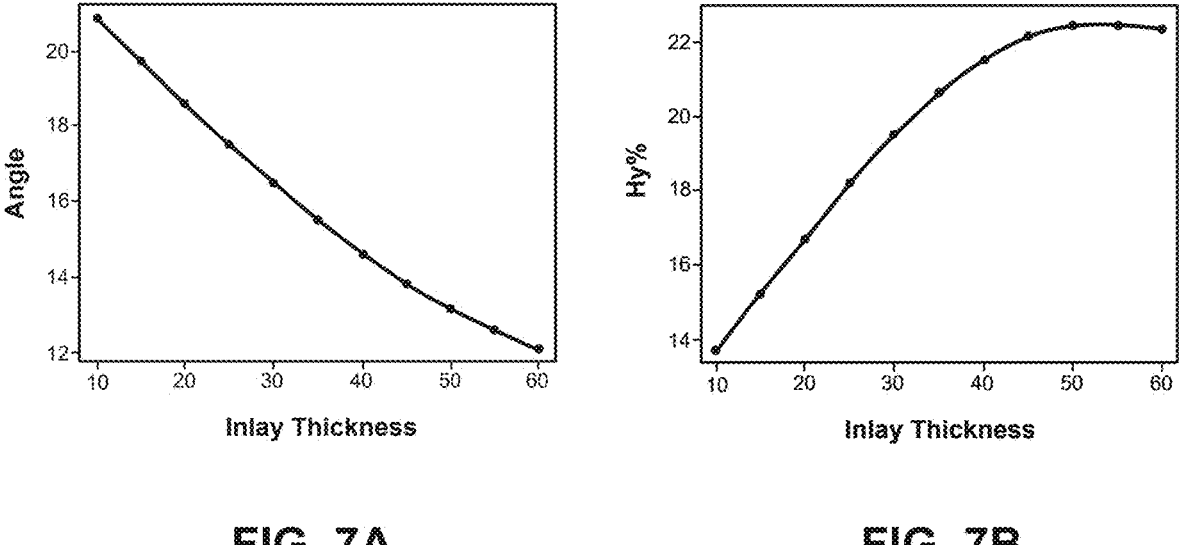
FIG. 7A                              FIG. 7B
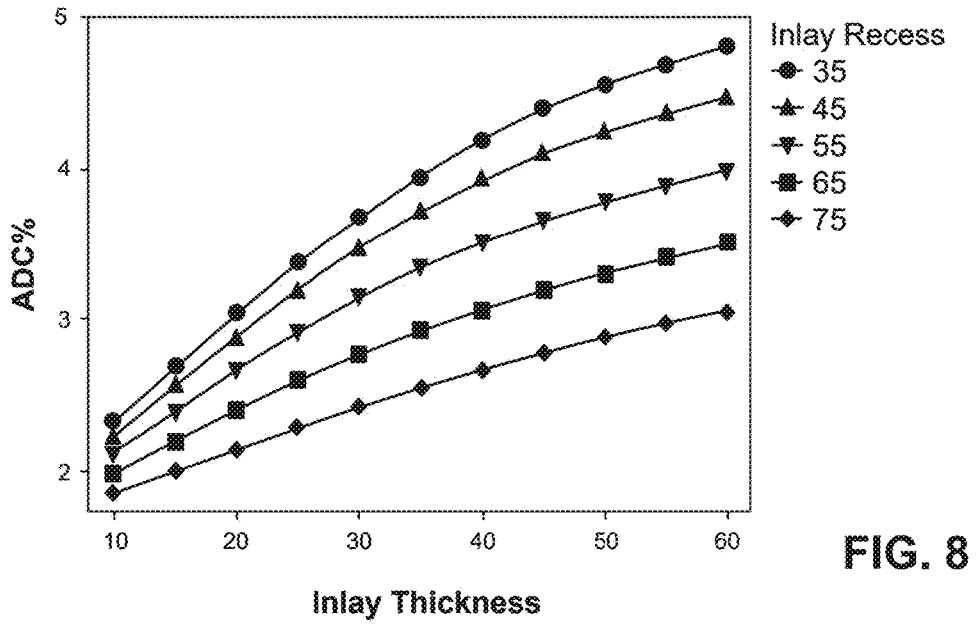
FIG. 8

NEAR FIELD TRANSDUCERS HAVING MAGNETIC INLAYS FOR IMPROVED HEAT-ASSISTED MAGNETIC RECORDING

TECHNICAL FIELD

The disclosure relates to magnetic writers, particularly for heat-assisted magnetic recording.

SUMMARY

In accordance with various aspects, the present disclosure describes recording heads for heat-assisted magnetic recording, such recording heads including a writer that has a write pole configured to produce a magnetic field for writing data on magnetic media adjacent to a media-facing surface of the recording head, the write pole extending to the media-facing surface, a near field transducer disposed proximate to the write pole, the near field transducer comprising an emitter disk disposed between a middle disk and a sunken disk, a peg attached to the emitter disk at a peg base and extending toward the media-facing surface, and a waveguide configured to deliver electromagnetic radiation to the sunken disk for coupling into the emitter disk, and an inlay of magnetic material incorporated into the emitter disk.

In certain aspects, the presence of the inlay decreases the magnetic field angle and/or increases the magnetic field strength during write operations.

In certain aspects, the inlay has a thickness that extends only through a portion of the emitter disk, or that extends through an entire thickness of the emitter disk and into a portion of the sunken disk. Moreover, the inlay may have a length that extends substantially the same as the emitter disk, or that extends for only a portion of the emitter disk.

In certain aspects, the inlay extends to the peg base or may be recessed from the peg base.

In certain aspects, the inlay has a different shape from that of the emitter disk, or has the same shape as the emitter disk.

In accordance with various aspects, the present disclosure describes hard disk drives incorporating the described recording heads.

The details of one or more aspects of the disclosure are set forth in the accompanying drawings and the description below. Other features, objects, and advantages of the techniques described in this disclosure will be apparent from the description and drawings, and from the claims.

BRIEF DESCRIPTION OF THE DRAWINGS

FIGS. 3B1-B2 are schematic perspective views of a portion of an emitter disk and sunken disk of a near-field transducer in accordance with certain aspects of the present disclosure.

FIGS. 4B1-B2 are schematic perspective views of a portion of an emitter disk and sunken disk of a near-field transducer in accordance with certain aspects of the present disclosure.

FIG. 5A is a schematic side view of a portion of a writer for heat-assisted magnetic recording in accordance with certain aspects of the present disclosure.

FIGS. 5B1-B2 are schematic perspective views of a portion of an emitter disk and sunken disk of a near-field transducer in accordance with certain aspects of the present disclosure.

FIGS. 6B1-B2 are schematic perspective views of a portion of an emitter disk and sunken disk of a near-field transducer in accordance with certain aspects of the present disclosure.

FIGS. 7A-B are charts showing field angle at transition (7A) and perpendicular field strength (7B) as a function of emitter disk magnetic inlay thickness.

FIG. 8 is a chart showing areal density gain versus emitter disk magnetic inlay thickness for different inlay recess distances.

DETAILED DESCRIPTION

Figure 1:
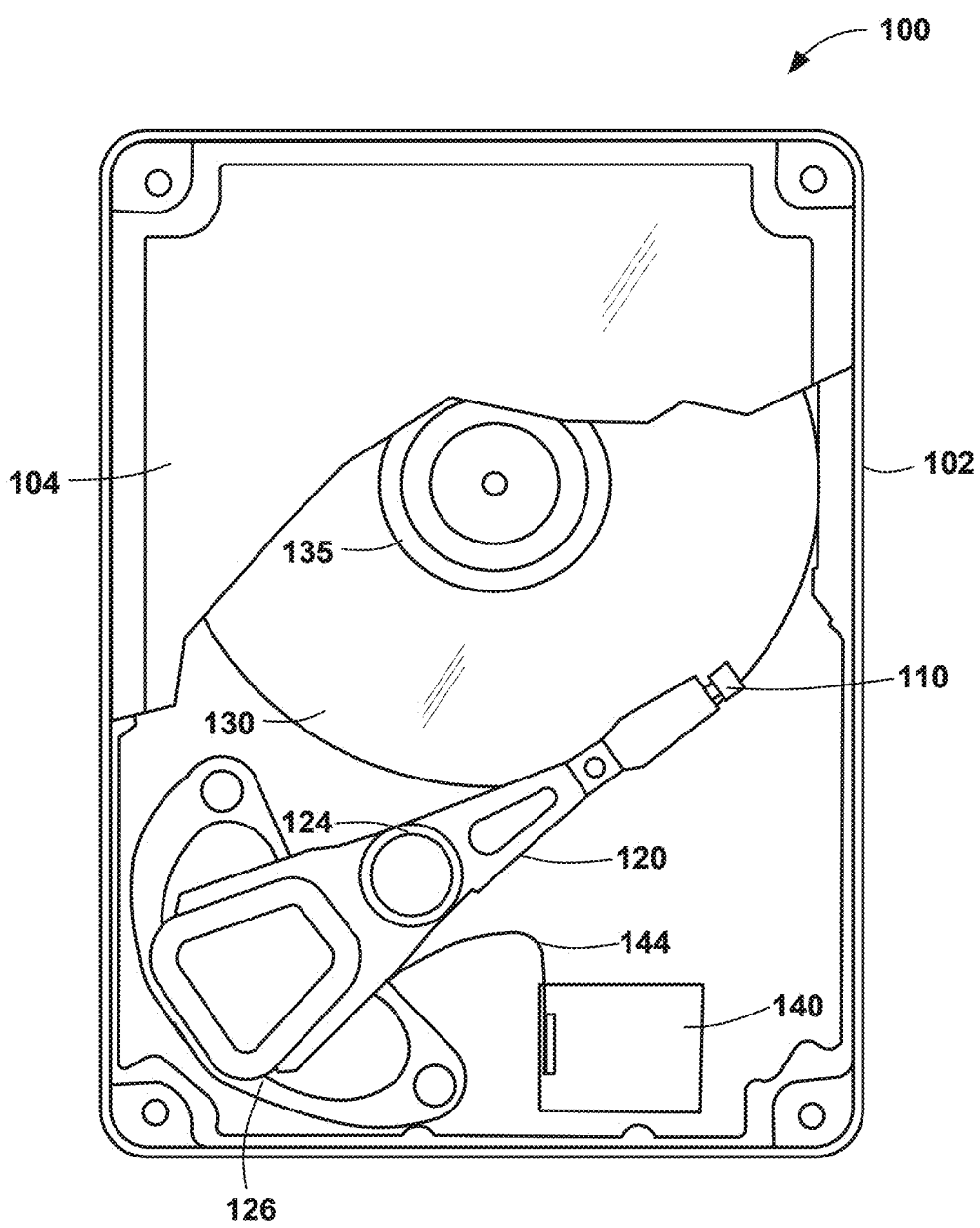
FIG. 1 is a schematic representation of a hard disk drive that may incorporate a magnetic writer in accordance with aspects of the present disclosure.

The present disclosure relates to recording heads for heat-assisted magnetic recording (HAMR) hard disk drives (HDDs). In HAMR, a near-field transducer (NFT) is used to generate plasmonic activity that can be focused and directed at the recording surface of a magnetic medium, thereby momentarily reducing the coercivity of the magnetic medium during data writing operations using a magnetic field applied by the write transducer of the recording head. HAMR allows for higher coercivity recording media to be used, thereby enhancing the stability of smaller bits, which enables higher areal density capability (ADC). In a HAMR recording head, the write pole is located proximate to the NFT. In accordance with the present disclosure, providing an inlay of a magnetic material in certain NFT components can reduce magnetic field angle, improve magnetic field amplitude, and decrease magnetic field risetime, all of which may contribute to increased ADC. In particular, aspects of the present disclosure involve applying an inlay of a magnetic material to the emitter disk (also referred to as a bottom disk, or BDSC) and/or and inlay of magnetic material that extends into the emitter disk and the sunken disk (SDSC) of the NFT, to thereby enhance magnetic field characteristics that may lead to increased ADC.

Of the limitations to ADC growth in HAMR HDD development, transition noise and remanence noise (remanence is the magnetization left behind in a ferromagnetic material) are two major candidates for mitigation. Intrinsically, due to the superparamagnetic effect and thermal fluctuation in the writing process, these noises not only relate to geometric and magnetic property variations in the media grain, but also relate to the thermal profile quality and magnetic field quality of the writer. In practice, it is difficult for writer design to achieve a smaller field angle and a strong field amplitude at the same time to thereby produce the field quality needed for further ADC gains.

In accordance with the present disclosure, and without wishing to be bound by any theory, a magnetic inlay applied inside an NFT's emitter disk, or a magnetic inlay applied inside an NFT's emitter disk and sunken disk, can effectively conduct more magnetic flux to the leading side of the transition location through the flux re-distribution in the write pole. This can greatly reduce the field angle at the transition and simultaneously increase field amplitude, resulting in substantial ADC gains through transition quality improvement and remanence noise reduction. As such, aspects of the present disclosure provide the ability to generate significantly more field angle reduction while at the same time providing significantly more field amplitude improvement.

Reference will now be made to the drawings, which depict one or more aspects described in this disclosure. However, it will be understood that other aspects not depicted in the drawings fall within the scope of this disclosure. Like numbers used in the figures refer to like components, steps, and the like. However, it will be understood that the use of a reference character to refer to an element in a given figure is not intended to limit the element in another figure labeled with the same reference character. In addition, the use of different reference characters to refer to elements in different figures is not intended to indicate that the differently referenced elements cannot be the same or similar. It will also be appreciated that the drawings are meant to illustrate certain aspects and arrangements of features in a way that contributes to their understanding and are not meant to be scale drawings that accurately represent size or shape of elements.

FIG. 1 schematically depicts an example HDD device 100 that includes a recording head 110 having read and write capabilities. Recording head 110 is disposed on the end of an actuator arm 120 that is rotationally movable around a pivot 124 by use of a voice coil motor 126. Other driving and actuation mechanisms may be used, including piezoelectric motors, linear rail actuators, and so forth. The recording head 110 is positioned in close proximity to the surface of magnetic media disk 130 such that the recording head can write data to and read data from tracks on the magnetic media 130 as it spins by action of a spindle motor 135. Controller electronics 140 may be coupled to the voice coil motor 126 and recording head 110 via a flex cable 144 that connects to traces on the actuator 120. Preamp electronics (not indicated) are typically disposed close to the recording head 110 for conditioning signals to and from the recording head. Controller electronics 140 may also be communicatively coupled to spindle motor 135, and thereby control the spinning of the media disk(s) 130 along with the movement of the actuator 120 and the reading and writing of data via recording head 110.

The internal components of conventional HDD 100 are contained within an enclosure 102, including cover 104, which is shown partially cut away to reveal the internal components. The enclosure 102 may be sealed and filled with a desired atmosphere, such as a gas mixture including primarily helium gas, to create a controlled environment inside the HDD 100. A host device can communicate with conventional HDD 100 through a standardized interface (not shown). HDD 100 can operate on any magnetic recording principle, whether that be conventional magnetic recording (CMR), shingled magnetic recording (SMR), HAMR, or any other type of recording technique, including combinations thereof. Recording head 110 may include a writer for heat-assisted magnetic recording that is configured in accordance with one or more aspects of the present disclosure.

Figure 2A:
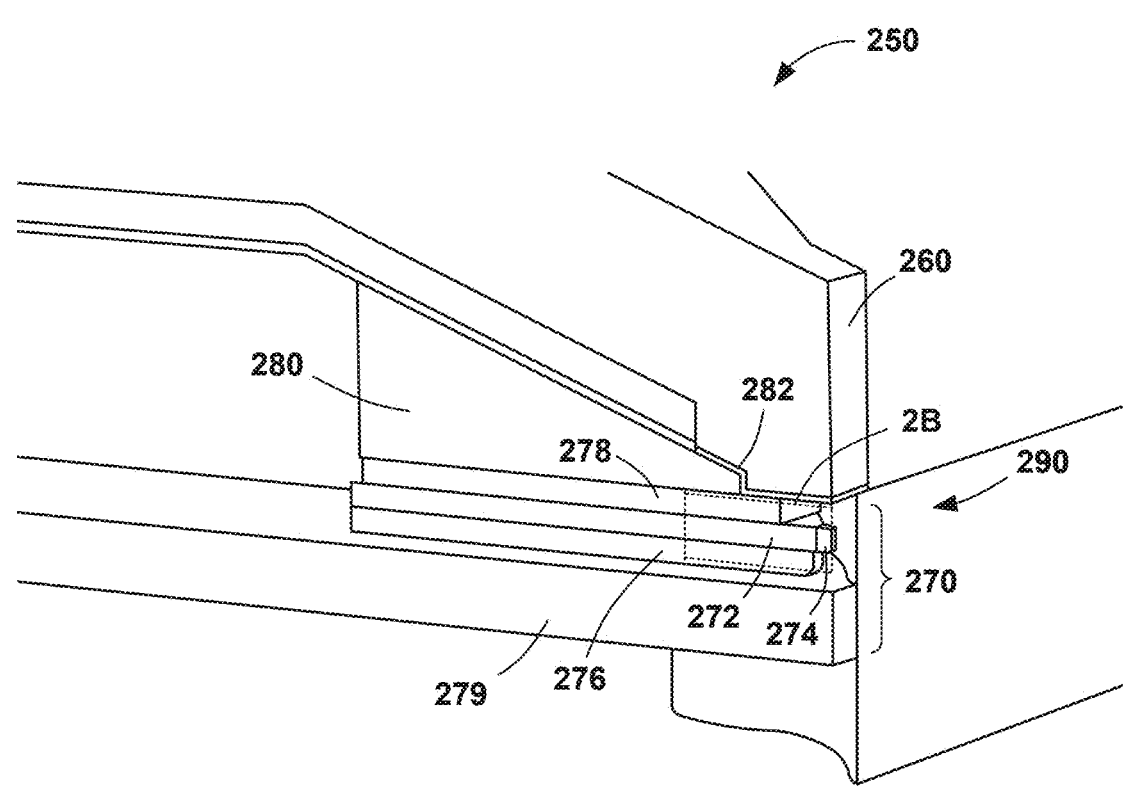
FIG. 2A is a schematic perspective view of a writer portion of a heat-assisted magnetic recording head.

FIG. 2A shows a schematic perspective view of a portion of a HAMR writer 250 that may be incorporated into a recording head. Writer 250 includes a write pole 260 and an NFT 270 that each extend to a media-facing surface 290 of the recording head. NFT 270 includes an emitter disk 272 disposed between a middle disk 278 and a sunken disk 276. Emitter disk 272 may include a peg 274 that extends from the main body of emitter disk 272 toward the media-facing surface 290. A waveguide 279 delivers electromagnetic radiation, such as laser light from a laser diode (not shown), to the NFT 270. The electromagnetic radiation may be coupled into the sunken disk 276 for generation of plasmonic activity at the emitter disk 272. Peg 274 may focus and direct plasmons to the surface of the recording medium (not shown) to assist in the recording process. A heat sink 280 may be disposed between the NFT 270 and the write pole 260, and a diffusion barrier 282 may be disposed between the heat sink 280 and the write pole 260.

Figure 2B:
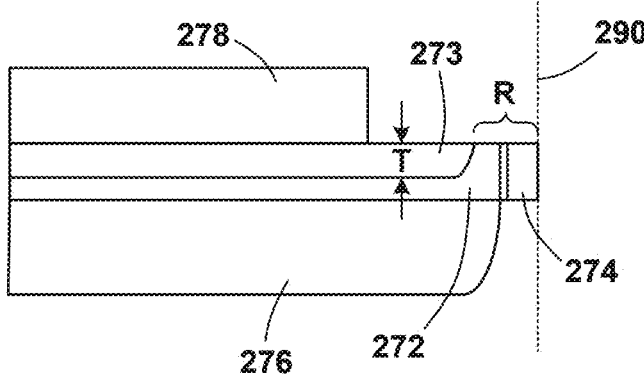
FIG. 2B is a schematic side view of the portion 2B of the writer shown in FIG. 2A.

In accordance with various aspects of the present disclosure, a magnetic inlay is introduced inside the emitter disk of an NFT, and optionally extending into the sunken disk, of a HAMR writer. FIG. 2B shows a schematic side view of the dashed box 2B in FIG. 2A. Emitter disk 272 has a peg 274 that extends to the media-facing surface 290. Emitter disk 272 is disposed between a middle disk 278 and a sunken disk 276. Emitter disk 272 includes a magnetic inlay 273 formed therein. Inlay 273 has a thickness T and is recessed from the media-facing surface by a recess amount R. As shown in FIG. 2B, inlay 273 has a thickness T that extends part way through the thickness of the emitter disk 272. In various embodiments, the inlay 273 may have a thickness that extends through the entire thickness of the emitter disk 272, and that may extend into the thickness of the sunken disk 276, and even through the entire thickness of the sunken disk 276. The recess amount R may be as small as the length of peg 274, meaning that the front of inlay 273 extends all the way to the base of the peg 274 (that is, where the peg 274 meets the emitter disk 272). While FIG. 2B shows that the middle disk 278, inlay 273, and sunken disk 276 all are recessed by different amounts, it will be appreciated that they can all be recessed by the same amount, or in relative amounts that differ from what is shown in FIG. 2B.

Moreover, it will be appreciated that, for deep inlays that extend through the emitter disk 272 into the sunken disk 276, the inlay recess R may differ in the emitter disk portion of the inlay and in the sunken disk portion of the inlay. In the case of deep inlays, the inlay material in the emitter disk portion and in the sunken disk portion may be composed of different materials. For example, the inlay material in the emitter disk may be selected to provide better thermal stability whereas the inlay material in the sunken disk may be selected to maximize magnetic field strength.

In certain aspects of the present disclosure, the middle disk 278 may be composed of a magnetic material, for example similar to the magnetic material provided in the write pole and/or the magnetic material provided in the magnetic inlay. A magnetic middle disk 278 may enhance the ADC improvement provided by the inclusion of the magnetic inlay 273 by allowing the middle disk and the inlay to magnetically couple to each other. In this way, the magnetic flux from the yoke and paddle of the write pole can be well conducted to the magnetic inlay, helping switch the magnetization in the inlay, and generating the desired magnetic field in the transition writing. In other aspects, the middle disk 278 may be composed of other materials such as Ir, Ru, Pt, Rh, Au, Cu, and so forth. The heat sink 280 may be composed of any suitable material such as Au or other good heat conductors. In certain embodiments, the heat sink 280 may also include magnetic materials.

In general, the inlays described in the present disclosure may be located from the top surface of the emitter disk, that is the surface oriented toward the write pole, which helps in maintaining a good magnetic connection, or exchange coupling, with the middle disk. As detailed in various embodiments, the inlay may be a shallow inlay that extends only into a portion of the thickness of the emitter disk, or may be a deep inlay that extends through the thickness of the emitter disk and into a portion of the sunken disk. Moreover, the inlay may be a long inlay that extends over a substantial portion of the length of the emitter disk, or may be a short inlay that extends for only a truncated portion of the length of the emitter disk.

The magnetic inlay may be composed of materials such as NiFe, FeCo, FeCoX where X may be C, Cr, Cu, Ir, Ni, Mo, V, and so forth, or various other magnetic materials. The magnetic moment of the inlay may be about 1.6 T to about 2.4 T. It has been found that the inlay dimensions that are most correlated to the magnetic performance are the inlay thickness and the inlay recess from the media-facing surface. The inlay thickness may be in a range from about 5 nm to 85 nm, and the inlay may be recessed from the media-facing surface by about 15 nm to 100 nm.

As illustrated in FIGS. 3-6, the length of the inlay, that is the dimension of the inlay that is perpendicular to the media-facing surface, can vary from short (covering only a portion of the emitter disk length) to long (covering most of the emitter disk length). As also illustrated in FIGS. 3-6, the width of the inlay may conform to the width of the emitter disk, either extending the entire width of the emitter disk, or extending less than the width of the emitter disk such that the edges of the emitter disk form a sort of shell around the inlay. The magnetic performance of the inlay is generally insensitive to the length and width of the inlay. Depending on the size of the emitter disk, the inlay might have lengths that range from about 230 nm to about 1110 nm, and might have widths that range from about 420 nm to about 510 nm. While the inlay may generally have a similar shape as the emitter disk and/or sunken disk, it will be appreciated that the inlay may have any arbitrary shape, and may have edges that deviate from the shapes of the edges of the emitter disk and/or sunken disk.

Figure 3A:
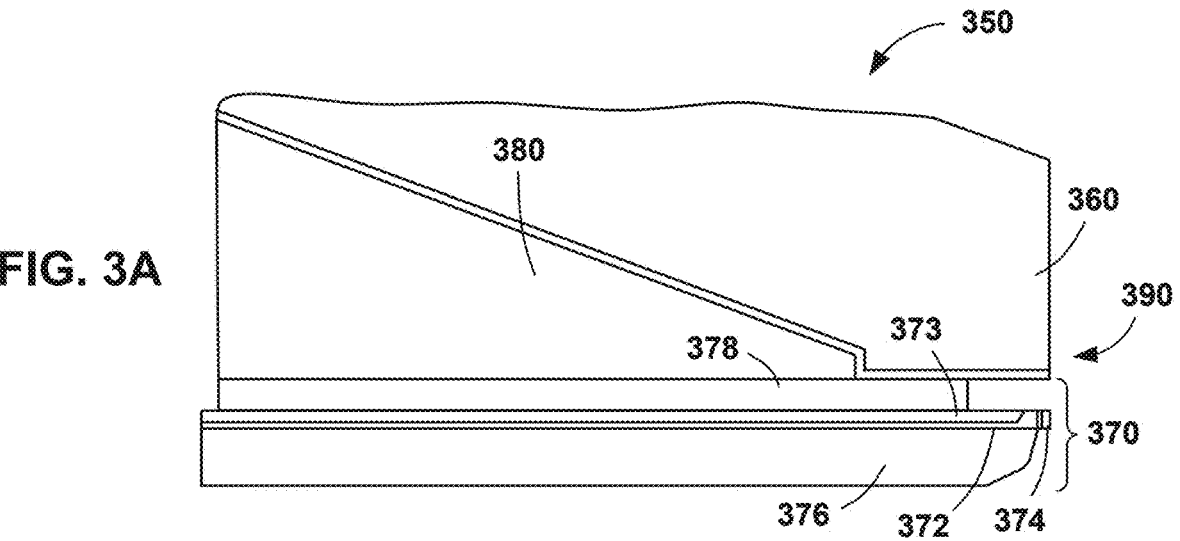
FIG. 3A is a schematic side view of a portion of a writer for heat-assisted magnetic recording in accordance with certain aspects of the present disclosure.

FIG. 3A shows a schematic side view of a portion of a writer 350 that includes an NFT 370 having an emitter disk 372 that incorporates a shallow and long magnetic inlay 373. Writer 350 includes a write pole 360 that extends to a media-facing surface 390, and a heat sink 380 disposed between the write pole 360 and the NFT 370. NFT 370 has an emitter disk 372 disposed between a middle disk 378 and a sunken disk 376, with the middle disk oriented toward the write pole 360. Peg 374 extends from the emitter disk 372 to the media-facing surface 390. In the embodiment shown in FIG. 3A, the inlay 373 is shallow in that its thickness does not extend through the entire thickness of the emitter disk 372. The inlay 373 can also be considered long in that it extends nearly the entire length of the emitter disk 372.

Figures 1, 3B:
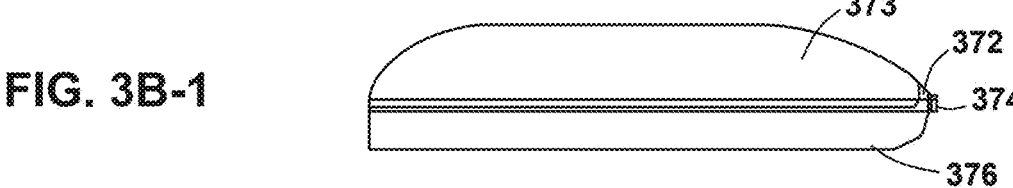
Figures 2, 3B:
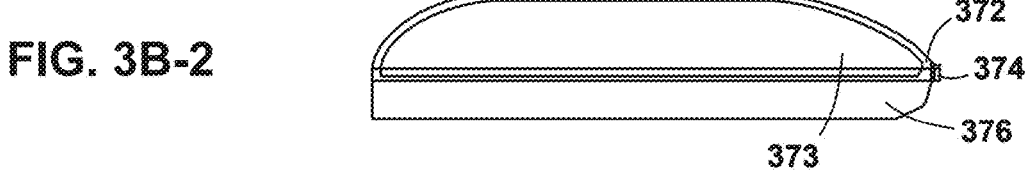

FIGS. 3B-1 and 3B-2 show schematic perspective views of two ways of forming inlay 373. In FIG. 3B-1, the inlay 373 extends to the edges of emitter disk 372 (and sunken disk 376), except for a portion of emitter disk 372 near the peg 374 that extends beyond the inlay 373, which helps define a recess amount of the inlay from the media-facing surface. In FIG. 3B-2, the inlay 373 does not extend all the way to the edges of emitter disk 372 so that the edges of emitter disk 372 form a shell around the inlay 373.

Figure 4A:
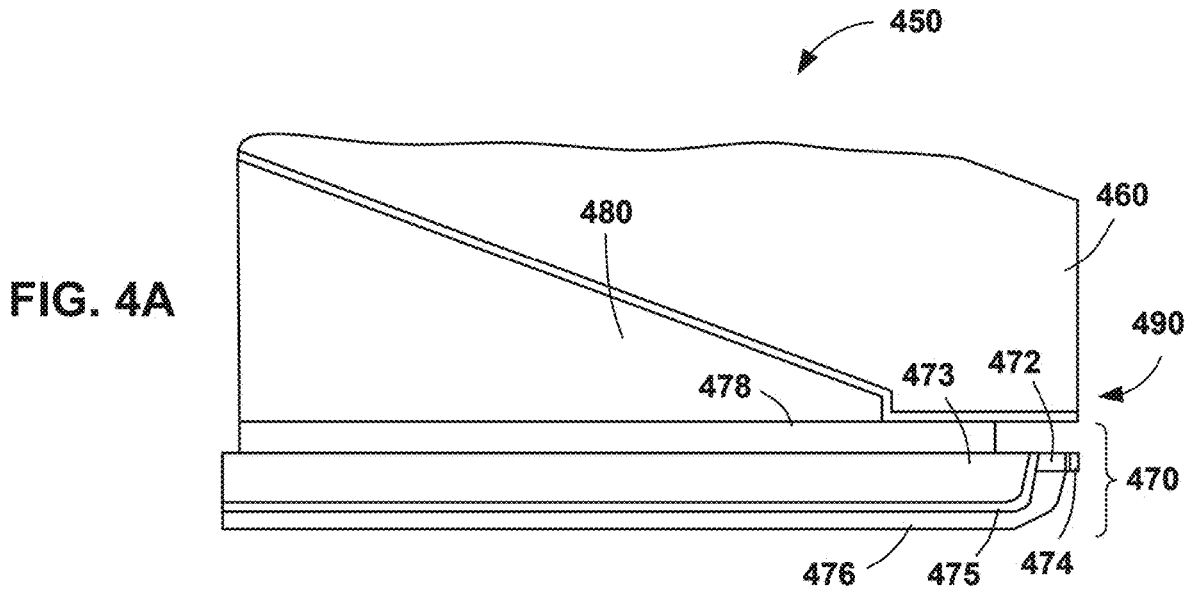
FIG. 4A is a schematic side view of a portion of a writer for heat-assisted magnetic recording in accordance with certain aspects of the present disclosure.

FIG. 4A shows a schematic side view of a portion of a writer 450 that includes an NFT 470 having an emitter disk 472 that incorporates a deep and long magnetic inlay 473. Writer 450 includes a write pole 460 that extends to a media-facing surface 490, and a heat sink 480 disposed between the write pole 460 and the NFT 470. NFT 470 has an emitter disk 472 disposed between a middle disk 478 and a sunken disk 476, with the middle disk oriented toward the write pole 460. Peg 474 extends from the emitter disk 472 to the media-facing surface 490. In the embodiment shown in FIG. 4A, the inlay 473 is deep in that its thickness extends deeper than the thickness of the emitter disk 472. The inlay 473 can also be considered long in that it extends nearly the entire length of the emitter disk 472. A diffusion barrier 475 may be formed between the sunken disk 476 and the inlay 473 to thereby protect from diffusion of material from the sunken disk (such as Au) into the magnetic inlay 473.

Figures 1, 4B:
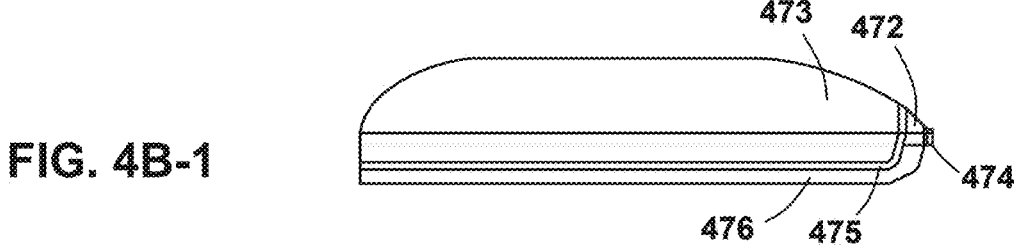
Figures 2, 4B:
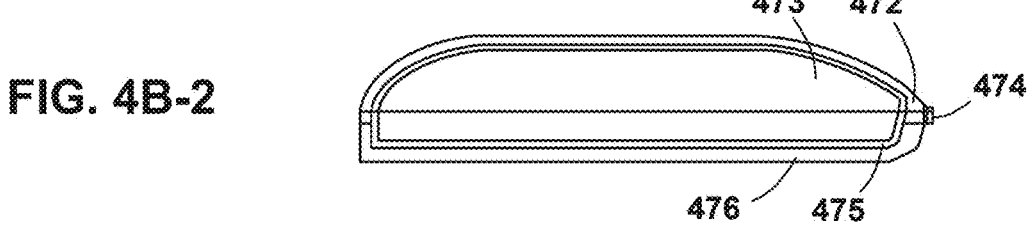

FIGS. 4B-1 and 4B-2 show schematic perspective views of two ways of forming inlay 473. In FIG. 4B-1, the inlay 473 extends to the edges of emitter disk 472 (and sunken disk 476), except for a portion of emitter disk 472 near the peg 474 that extends beyond the inlay 473, which helps define a recess amount of the inlay from the media-facing surface. In FIG. 4B-2, the inlay 473 does not extend all the way to the edges of emitter disk 472 so that the edges of emitter disk 472 form a shell around the inlay 473.

FIG. 5A shows a schematic side view of a portion of a writer 550 that includes an NFT 570 having an emitter disk 572 that incorporates a shallow and short magnetic inlay 573. Writer 550 includes a write pole 560 that extends to a media-facing surface 590, and a heat sink 580 disposed between the write pole 560 and the NFT 570. NFT 570 has an emitter disk 572 disposed between a middle disk 578 and a sunken disk 576, with the middle disk oriented toward the write pole 560. Peg 574 extends from the emitter disk 572 to the media-facing surface 590. In the embodiment shown in FIG. 5A, the inlay 573 is shallow in that its thickness does not extend through the entire thickness of the emitter disk 572. The inlay 573 can also be considered short in that its length extends for only a portion of the length of the emitter disk 572.

FIGS. 5B-1 and 5B-2 show schematic perspective views of two ways of forming inlay 573. In FIG. 5B-1, the inlay 573 extends to the width edges of emitter disk 572 (and sunken disk 576). In FIG. 5B-2, the inlay 573 does not extend all the way to the width edges of emitter disk 572 so that the width edges of emitter disk 572 form a shell around the inlay 573.

Figure 6A:
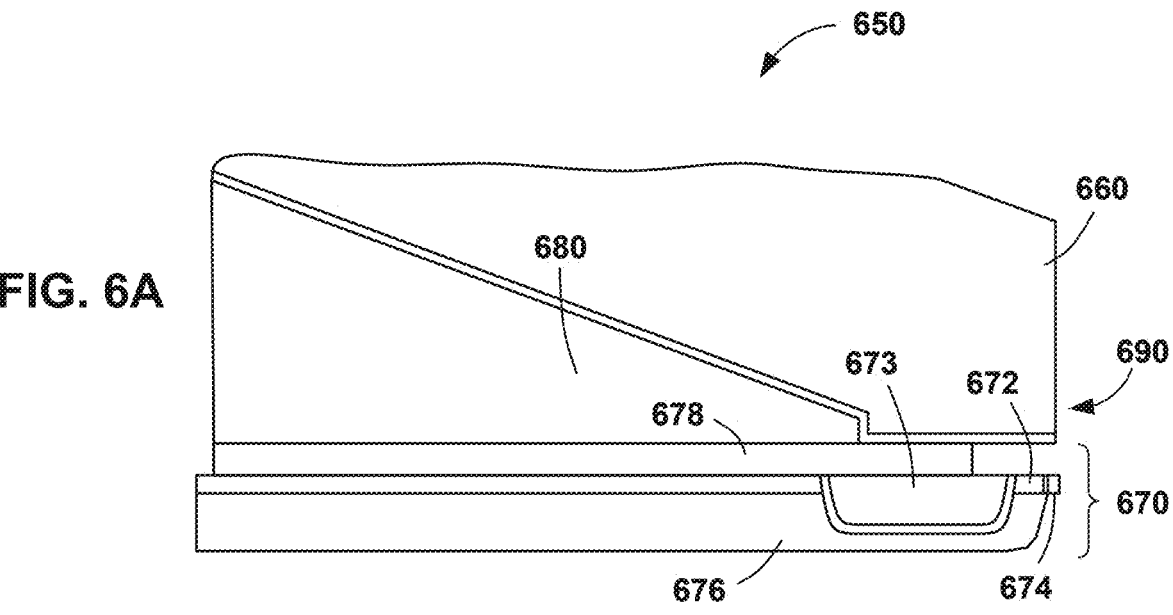
FIG. 6A is a schematic side view of a portion of a writer for heat-assisted magnetic recording in accordance with certain aspects of the present disclosure.

FIG. 6A shows a schematic side view of a portion of a writer 650 that includes an NFT 670 having an emitter disk 672 that incorporates a deep and short magnetic inlay 673. Writer 650 includes a write pole 660 that extends to a media-facing surface 690, and a heat sink 680 disposed between the write pole 660 and the NFT 670. NFT 670 has an emitter disk 672 disposed between a middle disk 678 and a sunken disk 676, with the middle disk oriented toward the write pole 660. Peg 674 extends from the emitter disk 672 to the media-facing surface 690. In the embodiment shown in FIG. 6A, the inlay 673 is deep in that its thickness extends deeper than the thickness of the emitter disk 672. The inlay 673 can also be considered short in that its length extends for only a portion of the length of the emitter disk 672. A diffusion barrier 675 may be formed between the sunken disk 676 and the inlay 673 to thereby protect from diffusion of material from the sunken disk (such as Au) into the magnetic inlay 673.

Figures 1, 6B:
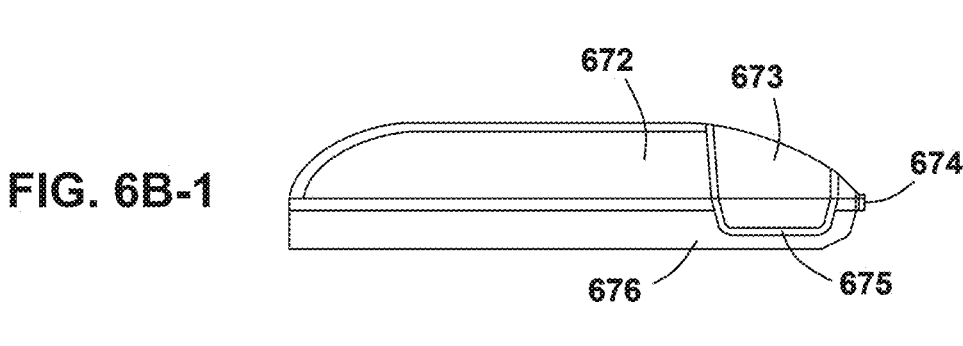
Figures 2, 6B:
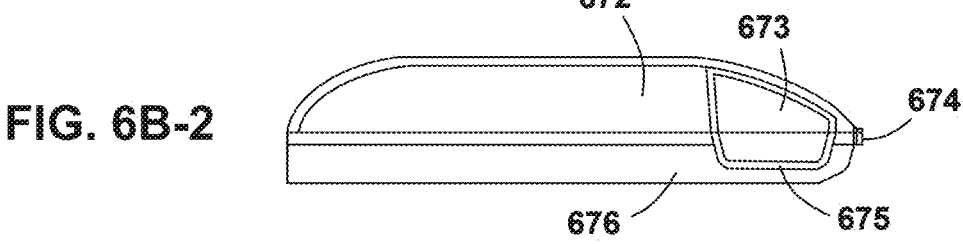

FIGS. 6B-1 and 6B-2 show schematic perspective views of two ways of forming inlay 673. In FIG. 6B-1, the inlay 673 extends to the width edges of emitter disk 672 (and sunken disk 676). In FIG. 6B-2, the inlay 673 does not extend all the way to the width edges of emitter disk 672 so that the width edges of emitter disk 672 form a shell around the inlay 673.

FIG. 7 and FIG. 8 are charts that indicate aspects of the magnetic performance of emitter disk inlays in accordance with the present disclosure, particularly as a function of inlay thickness and inlay recess. In HAMR writer design, a small magnetic field angle is preferred for ADC improvement. Using a magnetic inlay inside the emitter disk, or inside the emitter disk and extending into the sunken disk, can effectively decrease field angle in transition writing. Such inlays can also increase field amplitude and reduce the dynamic field risetime. Modeling shows that with the magnetic inlay, a large ADC gain can be obtained, particularly when the depth of the inlay is increased. In addition, due to the magnetic flux re-distribution in the write pole when a magnetic inlay is used, the erasure field under the write pole may be decreased. Moreover, to reduce the potential impact to the thermal performance of the NFT, the inlay may be recessed from the media-facing surface, and the amount of recess can affect ADC gains.

Without wishing to be bound by any theory, by incorporating a magnetic inlay into the emitter disk of an NFT, magnetic flux inside the write pole may be re-distributed so that more flux can be directed to the leading side of the transition location. This can generate significant reduction in field angle, as well as improve field amplitude. FIGS. 7A and 7B show the results of modeling the performance of an inlay having a magnetic moment Bs=2.3 T, and using a fixed inlay recess of 35 nm. FIG. 7A indicates that field angle decreases with increased inlay thickness, and FIG. 7B indicates that field amplitude (Hy %) is significantly improved with increased inlay thickness. As indicated in FIG. 8, combining these two effects can produce a pronounced ADC gain, particularly as the inlay thickness is increased. Moreover, the ADC gains can be improved by reducing the amount of recess of the inlay from the media-facing surface.

Modeling further suggests that the use of a magnetic inlay in accordance with aspects of the present disclosure can also decrease the erasure field under the write pole and near the NFT thermal bubble. Without wishing to be bound by any theory, modeling results suggest that the fringing field reduction under the write pole attributes to the flux re-distribution in the write pole when the magnetic inlay is present, and the weaker adjacent track erasure field attributes to the large field angle reduction near the NFT.

Figure 9A:
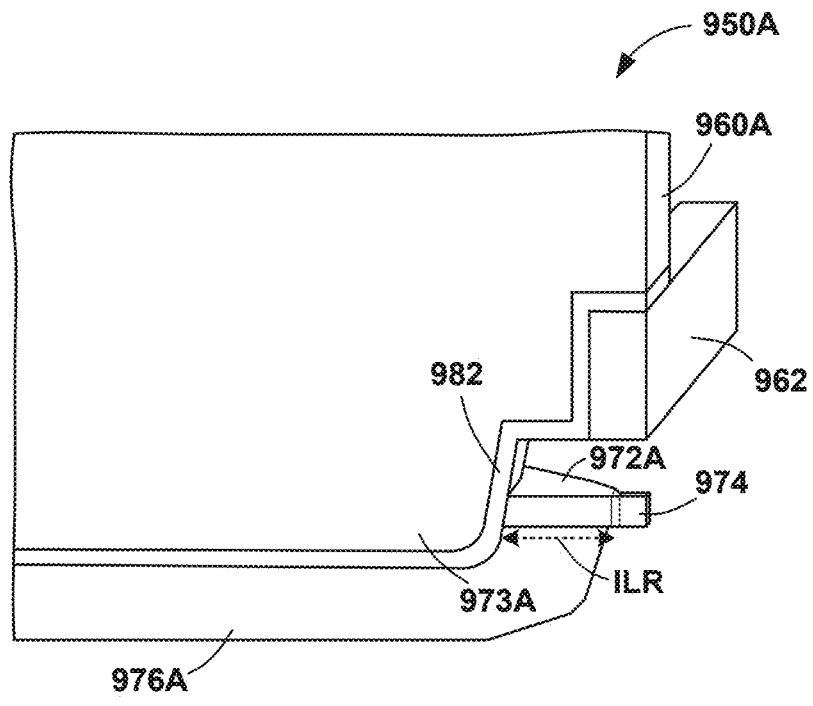
FIGS. 9A-B are schematic perspective views of a portion of a writer for heat-assisted magnetic recording in accordance with certain aspects of the present disclosure.
Figure 9B:
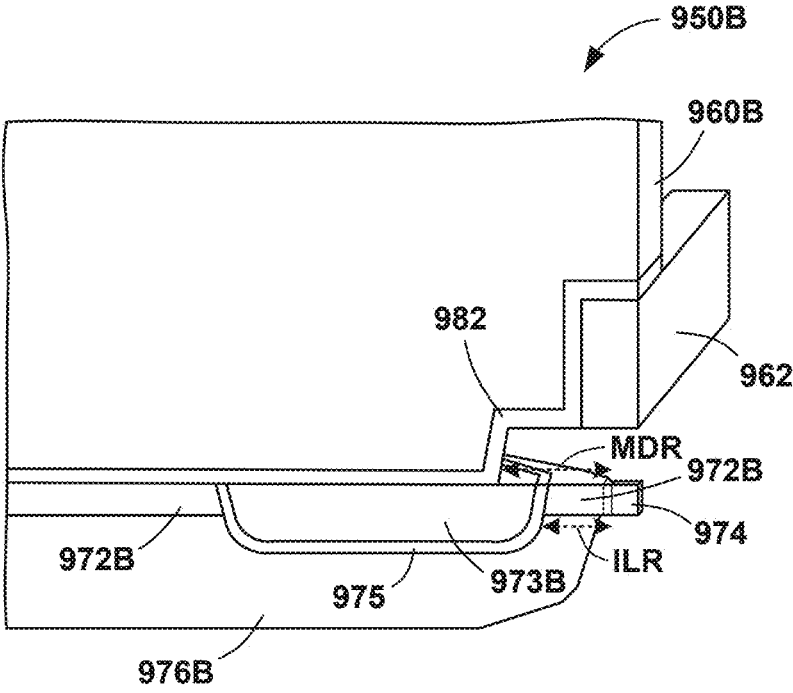

FIGS. 9A and 9B schematically show embodiments in which the write pole is extended to be integral with the area that would be considered as the middle disk of the NFT. For example, FIG. 9A illustrates a writer 950A having a "one-piece" construction in which the write pole 960A extends down into the "middle disk" area of the NFT, and extends further into the emitter disk 972A and the sunken disk 976A to form an inlay region 973A. Inlay region 973A may be recessed from the base of peg 974 by an inlay recess amount ILR. The inlay recess amount ILR can be selected to provide the desired combination of magnetic and thermal properties. In certain embodiments, a barrier layer 982 may be formed between the write pole 960A (and its middle disk and inlay extensions) and the sunken disk 973A and emitter disk 972A portions of the NFT. Writer 950A is also shown to include a peg coupler 962.

FIG. 9B illustrates a writer 950B having a "two-piece" construction in which the write pole 960B extends down into the "middle disk" area of the NFT. A separate inlay 973B is provided, which may be long or short, or deep or shallow in accordance with described embodiments. In FIG. 9B, inlay 973B extends through emitter disk 972B and into the sunken disk 976B. Inlay 973B may be recessed from the base of peg 974 by an inlay recess amount ILR. Moreover, the middle disk portion of the write pole 960B, which reside just above the inlay 973B, may be recessed from the base of peg 974 by a middle disk recess amount MDR. The recess amounts ILR and MDR can be selected independently to produce a desired combination of magnetic, optical, and thermal properties. In general, a smaller ILR provides better magnetics, whereas a larger MDR provides better optics. In certain embodiments, a barrier layer 982 may be formed between the write pole 960B and the inlay 973B/emitter disk 972B portions of the NFT. Barrier layer 975 may be provided between the inlay 973B and the sunken disk 976B. Writer 950B is also shown to include a peg coupler 962.

It should be understood that various aspects disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (for example, all described acts or events may not be necessary to carry out the techniques).

All scientific and technical terms used herein have meanings commonly used in the art unless otherwise specified. The definitions provided herein are to facilitate understanding of certain terms used frequently herein and are not meant to limit the scope of the present disclosure.

As used herein, the term "configured to" may be used interchangeably with the terms "adapted to" or "structured to" unless the content of this disclosure clearly dictates otherwise.

As used herein, the term "or" refers to an inclusive definition, for example, to mean "and/or" unless its context of usage clearly dictates otherwise. The term "and/or" refers to one or all of the listed elements or a combination of at least two of the listed elements.

As used herein, the phrases "at least one of" and "one or more of" followed by a list of elements refers to one or more of any of the elements listed or any combination of one or more of the elements listed.

As used herein, the terms "coupled" or "connected" refer to at least two elements being attached to each other either directly or indirectly. An indirect coupling may include one or more other elements between the at least two elements being attached. Further, in one or more embodiments, one element "on" another element may be directly or indirectly on and may include intermediate components or layers therebetween. Either term may be modified by "operatively" and "operably," which may be used interchangeably, to describe that the coupling or connection is configured to allow the components to interact to carry out described or otherwise known functionality.

As used herein, any term related to position or orientation, such as "proximal," "distal," "end," "outer," "inner," and the like, refers to a relative position and does not limit the absolute orientation of an embodiment unless its context of usage clearly dictates otherwise.

The singular forms "a," "an," and "the" encompass embodiments having plural referents unless its context clearly dictates otherwise.

As used herein, "have," "having," "include," "including," "comprise," "comprising" or the like are used in their open-ended sense, and generally mean "including, but not limited to." It will be understood that "consisting essentially of," "consisting of," and the like are subsumed in "comprising," and the like.

Reference to "one embodiment," "an embodiment," "certain embodiments," or "some embodiments," etc., means that a particular feature, configuration, composition, or characteristic described in connection with the embodiment is included in at least one embodiment of the disclosure. Thus, the appearances of such phrases in various places throughout are not necessarily referring to the same embodiment of the disclosure. Furthermore, the particular features, configurations, compositions, or characteristics may be combined in any suitable manner in one or more embodiments.

The words "preferred" and "preferably" refer to embodiments of the disclosure that may afford certain benefits, under certain circumstances. However, other embodiments may also be preferred, under the same or other circumstances. Furthermore, the recitation of one or more preferred embodiments does not imply that other embodiments are not useful and is not intended to exclude other embodiments from the scope of the disclosure.

What is claimed is:

1. A recording head for heat-assisted magnetic recording, the recording head including a writer that comprises:
   a write pole configured to produce a magnetic field for writing data on magnetic media adjacent to a media-facing surface of the recording head, the write pole extending to the media-facing surface;
   a near field transducer disposed proximate to the write pole, the near field transducer comprising an emitter disk disposed between a middle disk and a sunken disk, a peg attached to the emitter disk at a peg base and extending toward the media-facing surface, and a waveguide configured to deliver electromagnetic radiation to the sunken disk for coupling into the emitter disk; and
   an inlay of magnetic material incorporated into the emitter disk.

2. The recording head of claim 1, wherein the inlay has a thickness that extends only through a portion of the emitter disk.

3. The recording head of claim 1, wherein the inlay has a thickness that extends through an entire thickness of the emitter disk and into a portion of the sunken disk.

4. The recording head of claim 3, further comprising a diffusion barrier disposed between the inlay and the sunken disk.

5. The recording head of claim 1, wherein the emitter disk and the inlay have lengths that extend in a direction perpendicular to the media-facing surface, and wherein the length of the inlay is substantially the same as the length of the emitter disk.

6. The recording head of claim 1, wherein the emitter disk and the inlay have lengths that extend in a direction perpendicular to the media-facing surface, and wherein the length of the inlay is smaller than the length of the emitter disk.

7. The recording head of claim 1, wherein the inlay extends to the peg base.

8. The recording head of claim 1, wherein the inlay is recessed from the peg base.

9. The recording head of claim 1, wherein the inlay has a different shape from that of the emitter disk.

10. The recording head of claim 1, wherein the inlay is composed of NiFe, FeCo, or FeCoX where X is C, Cr, Cu, Ir, Ni, Mo, or V.

11. The recording head of claim 1, wherein the inlay has a magnetic moment that is about 1.6 T to about 2.4 T.

12. The recording head of claim 1, wherein the inlay has a thickness of about 5 nm to about 85 nm.

13. The recording head of claim 1, wherein the inlay is recessed from the media-facing surface by about 15 nm to about 100 nm.

14. The recording head of claim 1, wherein the emitter disk forms a shell around the inlay.

15. The recording head of claim 1, wherein the presence of the inlay decreases the magnetic field angle during writing relative to a conventional recording head without the inlay.

16. The recording head of claim 1, wherein the presence of the inlay increases the magnetic field strength during writing relative to a conventional recording head without the inlay.

17. The recording head of claim 1, wherein at least one of the heat sink and the middle disk includes magnetic material.

18. The recording head of claim 1, wherein the middle disk and the inlay are recessed from the media-facing surface by the same amount.

19. The recording head of claim 1, further comprising a peg coupler disposed adjacent to the write pole at the media-facing surface.

20. A hard disk drive incorporating the recording head of claim 1.

\* \* \* \* \*